United States Patent
Peregrina Loera et al.

(10) Patent No.: US 9,688,208 B2
(45) Date of Patent: Jun. 27, 2017

(54) STORAGE BIN DOUBLE TRACK SYSTEM

(71) Applicant: FORD GLOBAL TECHNOLOGIES, LLC, Dearborn, MI (US)

(72) Inventors: Jose Alfredo Peregrina Loera, Mexico City (MX); Francisco Ronquillo Melendez, Puebla (MX); Omar Antonio Ramirez Pavon, Portales Norte (MX); David Castro Duran, Nezahualcoyotl (MX)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 14/872,828

(22) Filed: Oct. 1, 2015

(65) Prior Publication Data
US 2017/0096108 A1 Apr. 6, 2017

(51) Int. Cl.
*B60R 7/04* (2006.01)
(52) U.S. Cl.
CPC .................................. *B60R 7/04* (2013.01)
(58) Field of Classification Search
CPC ................ A47B 88/0407; A47B 88/04; A47B 2210/0059
USPC ....... 312/349, 350, 334.14, 404, 246, 334.7, 312/359, 330.1; 296/24.34, 37.8, 70, 296/37.12
See application file for complete search history.

(56) References Cited

U.S. PATENT DOCUMENTS

| | | | | |
|---|---|---|---|---|
| 1,817,504 | A * | 8/1931 | Bellinger | ................ B60R 9/065 190/15.1 |
| 4,067,632 | A * | 1/1978 | Sekerich | ................ A47B 88/10 312/334.9 |
| 4,121,876 | A | 10/1978 | Ratti | |
| 5,433,517 | A | 7/1995 | Fleisch | |
| 5,716,113 | A * | 2/1998 | Plourde | ................ A47B 96/025 222/160 |
| 5,893,619 | A | 4/1999 | Nachbaur | |
| 6,282,914 | B1 * | 9/2001 | Steinhoff | .............. A47F 3/0413 62/258 |
| 6,390,574 | B2 | 5/2002 | Fraccaro | |

(Continued)

OTHER PUBLICATIONS

"Excel TB-2080BBS-B Hardware 29" 7 Drawer Metal Rolling Chest", Excel International, http://www.cableorganizer.com/excel-international/tb-2080-rolling-chest.html, pp. 1-2, Jun. 12, 2015.

*Primary Examiner* — Dennis H Pedder
(74) *Attorney, Agent, or Firm* — Vichit Chea; King & Schickli PLLC

(57) ABSTRACT

A sliding storage compartment assembly for a motor vehicle includes a storage bin slidably received in a storage bin holder by a dual track assembly defined by opposed sets of rails and opposed sets of cooperating tracks. Each of the opposed sets of rails and opposed sets of cooperating tracks are vertically and laterally offset one from another. Each of the opposed sets of rails and each of the opposed sets of cooperating tracks may be vertically offset one from another in a vehicle z-axis direction and laterally offset from one another in a vehicle x-axis direction. The opposed sets of cooperating tracks may be disposed on opposed side walls of the storage bin holder and the opposed sets of rails may be disposed on opposed side walls of the storage bin, or vice-versa. Console assemblies including the sliding storage compartment assembly are described.

12 Claims, 3 Drawing Sheets

(56) References Cited

U.S. PATENT DOCUMENTS

2008/0079279 A1* 4/2008 Spykerman ............... B60R 7/04
                                                    296/24.34
2010/0033070 A1* 2/2010 Cheng .................. H05K 7/1421
                                                    312/334.7

* cited by examiner

STORAGE BIN DOUBLE TRACK SYSTEM

TECHNICAL FIELD

This disclosure relates generally to storage compartments or bins for motor vehicles, and more particularly to an improved track system for a motor vehicle sliding storage bin or drawer.

BACKGROUND

A wide variety of storage bins and compartments are provided in the modern motor vehicle to allow convenient storage and retrieval of large and small items. For example, it is known to provide small sliding storage compartments especially designed for items such as sunglasses, wherein the storage compartments are positioned in the motor vehicle for easy retrieval of the contents by the driver when seated in the motor vehicle. Likewise, it is known to provide larger sliding storage bins or drawers, for example center console-mounted storage bins or under-seat storage bins, to hold larger items. Conventionally, such vehicle sliding storage bins rely on a track system, similar in overall design to a drawer track system, for a smooth opening/closing action. Such conventional storage bin 1 track systems typically include a track assembly comprising a cooperating single rail 2 and track 3 disposed on each side of the sliding storage bin (see FIG. 1).

While substantially effective for their intended purpose, conventional sliding storage bins including a single track assembly suffer from certain deficiencies. In particular, single track system vehicle storage bins are prone to rocking and friction when opening/closing. That is, such prior art systems provide only two points of effort on each side of the bin 1 and therefore allow a significant degree of movement of the bin along a z (up/down) axis and along a y (in/out) axis, with attendant noise/squealing. This is in part related to the larger draft angles (the amount of taper for molded/cast parts perpendicular to a parting line) required for molded tracks to allow easy removal of the molded part from a mold. The rocking and friction associated with conventional sliding storage bins including a single track assembly leads to a perception of lesser vehicle quality and reduced consumer satisfaction. Molding equally-sized track parts with a smaller draft angle is an unsatisfactory, as the parts may be difficult to remove from the mold once hardened.

In turn, to fit large and/or heavy objects into a conventionally supported storage bin or drawer requires extending the drawer to a fully opened configuration, leaving the bin in a cantilevered condition with only two points of effort or support points in a rear portion of the bin tracks. Vehicle specification requirements of max load are usually high, which leads to a very large lever arm and thus to a huge bending moment with a strain increase in the two mentioned points. This state may lead to an overstrained material and possibly to a fracture in these effort concentration points.

To solve these and other problems, the present disclosure relates to a motor vehicle sliding storage bin including an offset dual track assembly. Advantageously, the described dual track assembly provides additional support for a sliding storage bin, reducing the above-summarized issues of bending moment, friction and rocking.

SUMMARY

In accordance with the purposes and benefits described herein, in one aspect a sliding storage compartment assembly for a motor vehicle is described. In embodiments, the sliding storage compartment assembly includes a storage bin slidably received in a storage bin holder by a dual track assembly defined by opposed sets of rails and opposed sets of cooperating tracks. Each of the opposed sets of rails and opposed sets of cooperating tracks are vertically and laterally offset one from another. Each of the opposed sets of rails and each of the opposed sets of cooperating tracks may be vertically offset one from another in a vehicle z-axis direction and laterally offset from one another in a vehicle x-axis direction. In embodiments, the opposed sets of cooperating tracks may be disposed on opposed side walls of the storage bin holder and the opposed sets of rails may be disposed on opposed side walls of the storage bin, or vice-versa. Console assemblies including the sliding storage compartment assembly are described.

In another aspect, a sliding track system for use with a sliding storage compartment assembly as described above is provided.

In the following description, there are shown and described embodiments of the disclosed motor vehicle sliding storage bin assembly. As it should be realized, the assembly is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed motor vehicle sliding storage bin assembly, and together with the description serve to explain certain principles thereof. In the drawing.

Reference will now be made in detail to embodiments of the disclosed motor vehicle sliding storage bin assembly, examples of which are illustrated in the accompanying drawing figures.

DETAILED DESCRIPTION

As will be described in greater detail below, at a high level the described storage bin assembly includes a dual track system wherein a track and rail assembly are divided to provide a vertical and a lateral offset, to provide multiple attachment points on each side of the sliding storage bin. Advantageously, the described configuration, by providing multiple contact points for the sliding storage bin, increases the points of effort/support points for the storage bin assembly and reduces the required draft angles for the track/rail assembly. Further, a lesser requirement for supporting the storage bin during opening is imposed on a bezel associated with the assembly. Thus, additional support and reduced tolerances are provided for the sliding storage bin along the vehicle y (in/out) axis, as well as reducing a degree of motion of the storage bin in the vehicle z (up/down) axis. As yet another advantage, by dividing the track/rail assembly as described and reducing required tolerances therefore, costs of molding and tooling for manufacture of the sliding storage bin assembly are reduced.

Figure 1:
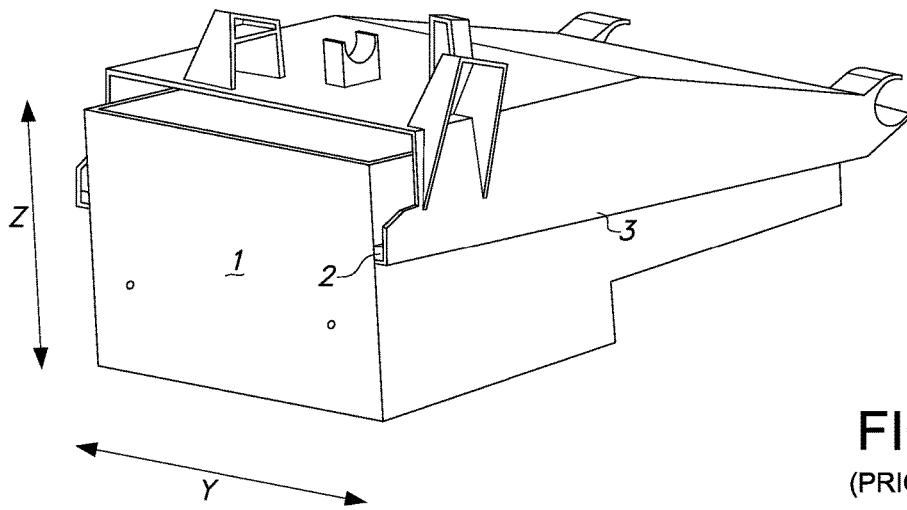
FIG. 1 depicts a prior art sliding storage bin for a motor vehicle.
Figure 2:
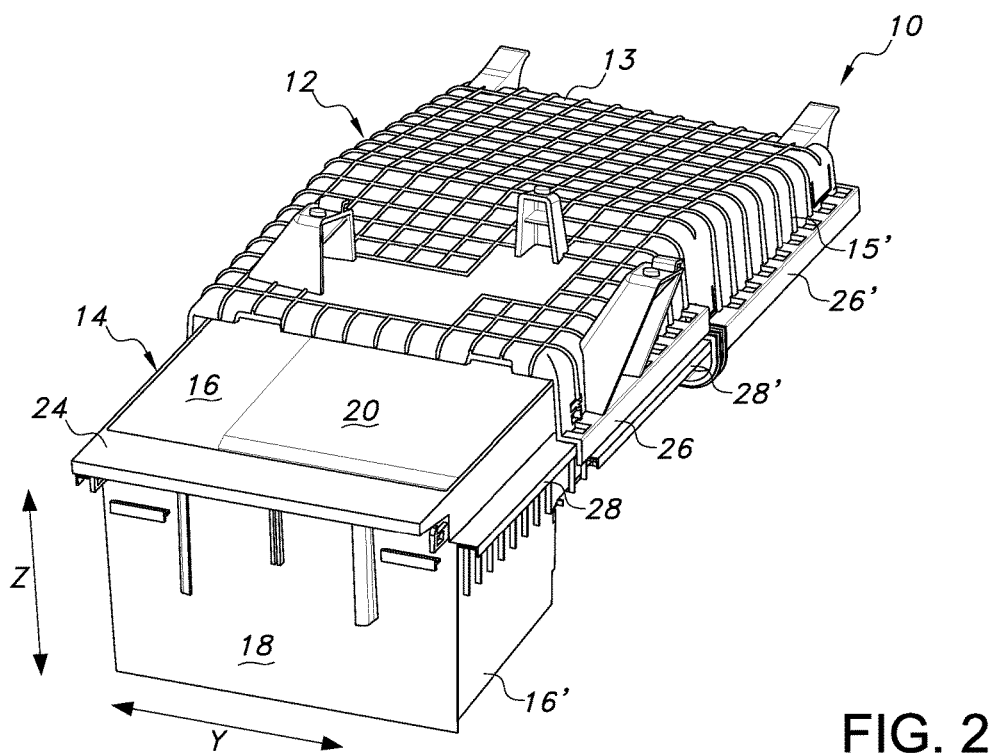
FIG. 2 depicts a front perspective view of a sliding storage bin for a motor vehicle according to the present disclosure.

Reference is now made to FIG. 2 illustrating a motor vehicle sliding storage bin assembly 10 according to the present disclosure. The assembly 10 includes a holder 12 for slidably receiving a bin 14 therein. Holder 12 includes at least a roof 13 and opposed holder side walls 15, 15'. Bin 14 is defined by bin side walls 16, 16', a front wall 18, a floor 20, and a rear wall 22 (not visible in this view) in combination defining a storage compartment or drawer. Bin 14 may also include a handle 24 for ease of opening/closing. Of course, a locking/latching assembly (not shown) may be included to secure bin 14 in a closed configuration. A number of suitable locking/latching assemblies are known such as simple catches, push-pull locks, push-push locks, and others, and use of any such suitable locking/latching assembly is contemplated.

The sliding storage bin assembly 10 also includes a track assembly for translating the storage bin 14 between an open and a closed configuration. As depicted, holder 12 includes a set of tracks 26, 26' disposed on each holder side wall 15, 15'. Likewise, storage bin 14 includes a set of cooperating rails 28, 28' disposed on each bin side wall 16, 16'. Of course, it will be appreciated that an alternate configuration is possible, i.e. disposing the tracks on each bin side wall 16, 16' and the rails 28, 28' on each receiver side wall. Each track 26, 26' defines a channel dimensioned for slidably receiving a rail 28, 28' therein. As will be appreciated, tracks 26, 26' and cooperating rails 28, 28' may be molded as integral portions of holder 12 and storage bin 14, respectively, or may be fabricated as separate parts and attached thereto.

Figure 3A:
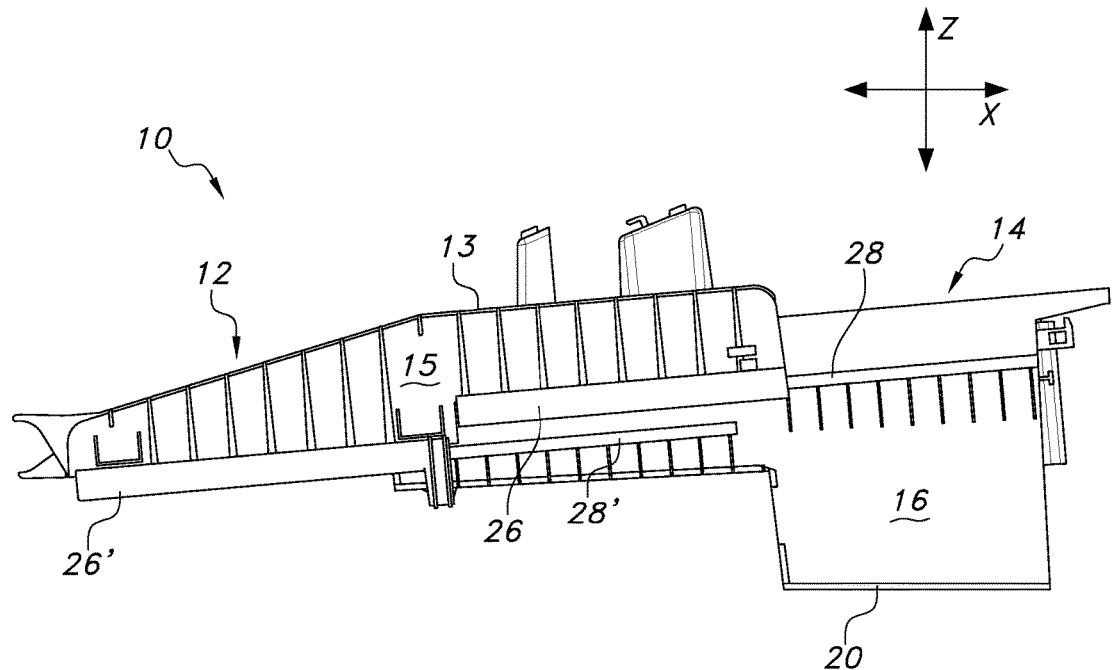
FIG. 3A depicts a side view of the sliding storage bin of FIG. 2 in an open configuration.
Figure 3B:
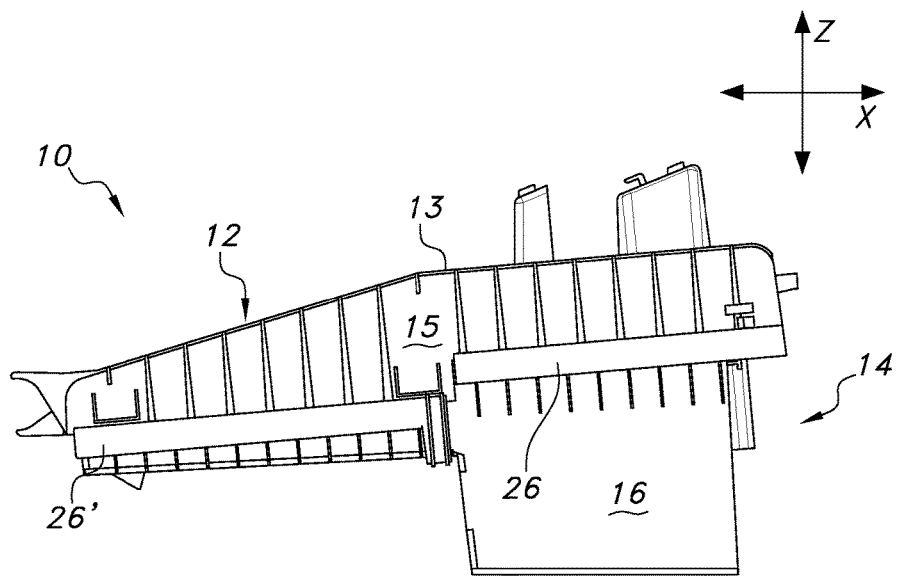
FIG. 3B depicts a side view of the sliding storage bin of FIG. 2 in a closed configuration.

As best shown in FIGS. 3A and 3B, tracks 26, 26' are vertically offset one from the other along the vehicle z-axis on holder side walls 15, 15', and also laterally offset one from the other on holder side walls 15, 15' along a vehicle x (fore/aft) axis. Likewise, the cooperating rails 28, 28' are vertically and laterally offset one from the other on storage bin side walls 16, 16' along the vehicle x-axis. As shown, tracks 26, 26' and rails 28, 28' are disposed such that a length dimension of a track of a set does not overlap a length dimension of another track of the set, and a length dimension of a rail of a set does not overlap a length dimension of another rail of the set. By this vertically offset configuration, multiple points of attachment between the storage bin 14 and the holder 12 are provided. Likewise, by the laterally offset configuration, multiple points of effort (see arrows) are provided at each opposed side of the storage bin assembly 10. This advantageously reduces the degree of motion of the storage bin 14 relative to the holder 12 along both the vehicle y-axis and z-axis, reducing rocking and friction during opening/closing of the bin 14.

Figure 4:
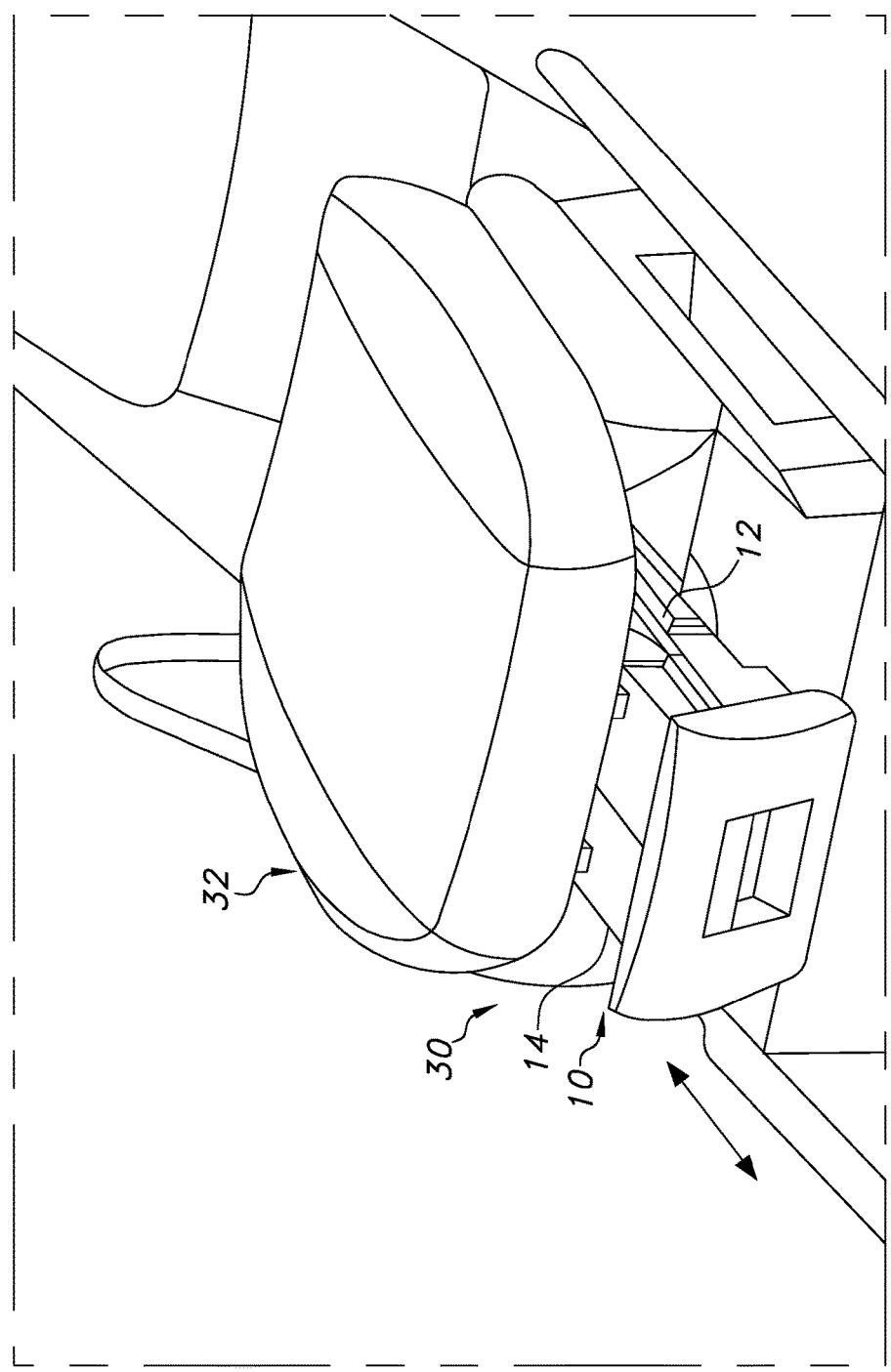
FIG. 4 depicts the sliding storage bin of FIG. 2 disposed in a motor vehicle center console.

FIG. 4 depicts a sliding storage bin assembly 10 according to the present disclosure, provided as an under-seat storage compartment assembly 30 disposed below a vehicle seat bottom 32. Of course this should not be taken as limiting, as the skilled artisan will readily appreciate that the storage bin assembly 10 could be disposed in any convenient location with a vehicle, for example in a front or rear center console, in a dash panel, in a rear seat armrest/divider, in a storage box assembly associated with a pickup truck bed or SUV/CUV cargo area, etc. As depicted, under-seat storage compartment assembly 30 defines a housing for the sliding storage bin assembly 10. A bezel 32 is disposed on the storage bin front wall 18, providing an attractive appearance to the assembly. Thus, an attractive and effective sliding storage bin is provided by use of the described dual track assembly.

Obvious modifications and variations are possible in light of the above teachings. The depicted embodiment of the sliding storage bin assembly 10 shows a simple sliding track and rail system including opposed sets of tracks 26, 26' and cooperating rails 28, 28'. However, it will be appreciated that alternative embodiments can be readily implemented. For example, the described track assembly may include more than two cooperating rail/track pairs in accordance with a size and/or weight dimension of the sliding storage bin assembly 10, for example three, four, or more cooperating rail/track pairs.

In still other alternatives, rollers/bearings may be associated with the rails 28, 28' and/or the tracks 26, 26' to ensure/improve smooth operation during opening/closing. As is also known, stops and/or hold-in mechanisms (not shown) may be included to retain the storage bin 14 in a closed configuration and/or an opened or deployed configuration, and/or to prevent inadvertent full removal of storage bin 14 from console assembly 30. Such mechanisms are well known to the skilled artisan, for example in the cabinetry and/or drawer slide arts, and require no further description herein. Still further, particular materials may be selected for fabrication of tracks 26, 26' and/or cooperating rails 28, 28' which, by their inherent lubricity, provide a smooth sliding action between the tracks/rails. All such modifications and variations are within the scope of the appended claims when interpreted in accordance with the breadth to which they are fairly, legally and equitably entitled.

What is claimed:

1. A sliding storage compartment assembly for a motor vehicle, comprising:
   a storage bin slidably received in a storage bin holder by a dual track assembly defined by opposed sets of rails and cooperating opposed sets of tracks;
   wherein each of the opposed sets of rails and cooperating opposed sets of tracks are vertically and laterally offset one from another;
   further wherein each rail of the opposed sets of rails and each track of the cooperating opposed sets of tracks are disposed whereby a rail length dimension does not overlap another rail length dimension and a track length dimension does not overlap another track length dimension.

2. The storage compartment assembly of claim 1, wherein each of the opposed sets of rails and each of the cooperating opposed sets of tracks are vertically offset one from another in a vehicle z-axis direction and laterally offset from one another in a vehicle x-axis direction.

3. A vehicle console assembly including the sliding storage compartment assembly of claim 1.

4. A sliding storage compartment assembly for a motor vehicle, comprising:
   a storage bin including a pair of vertically and laterally offset rails disposed on each opposed side thereof whereby a rail length dimension does not overlap another rail length dimension; and
   a storage bin holder including a pair of cooperating vertically and laterally offset tracks disposed on each opposed side thereof whereby a track length dimension does not overlap another track length dimension.

5. The storage compartment assembly of claim 4, wherein the offset rails and the cooperating offset tracks are vertically offset one from another in a vehicle z-axis direction and laterally offset from one another in a vehicle x-axis direction.

6. A vehicle console assembly including the sliding storage compartment assembly of claim 4.

7. A motor vehicle including the sliding storage compartment assembly of claim 4.

8. A sliding track system for a motor vehicle storage bin, comprising opposed sets of rails and cooperating opposed sets of tracks disposed whereby each of the opposed sets of rails and cooperating opposed sets of tracks are vertically and laterally offset one from another whereby a track length dimension does not overlap another track length dimension and a rail length dimension does not overlap another rail length dimension.

9. The sliding track system of claim 8, wherein each of the opposed sets of rails and each of the cooperating opposed sets of tracks are vertically offset one from another in a vehicle z-axis direction and laterally offset from one another in a vehicle x-axis direction.

10. The sliding track system of claim 8, wherein the cooperating opposed sets of tracks are adapted to be disposed on opposed side walls of a storage bin holder and the opposed sets of rails are adapted to be disposed on opposed side walls of a storage bin.

11. The sliding track system of claim 8, wherein the cooperating opposed sets of tracks are adapted to be disposed on opposed side walls of a storage bin and the opposed sets of rails are adapted to be disposed on opposed side walls of a storage bin holder.

12. A sliding storage bin assembly including the sliding track system of claim 8.

* * * * *